March 12, 1963     S. J. PRICE, JR     3,080,767
CONSTANT MESH TRANSMISSION

Filed March 3, 1961

*INVENTOR.*
STANLEY J. PRICE, JR.

INVENTOR.
STANLEY J. PRICE, JR.

March 12, 1963  S. J. PRICE, JR  3,080,767
CONSTANT MESH TRANSMISSION
Filed March 3, 1961  12 Sheets-Sheet 3

*INVENTOR.*
STANLEY J. PRICE, JR.

March 12, 1963

S. J. PRICE, JR 3,080,767

CONSTANT MESH TRANSMISSION

Filed March 3, 1961

*INVENTOR.*
STANLEY J. PRICE, JR.

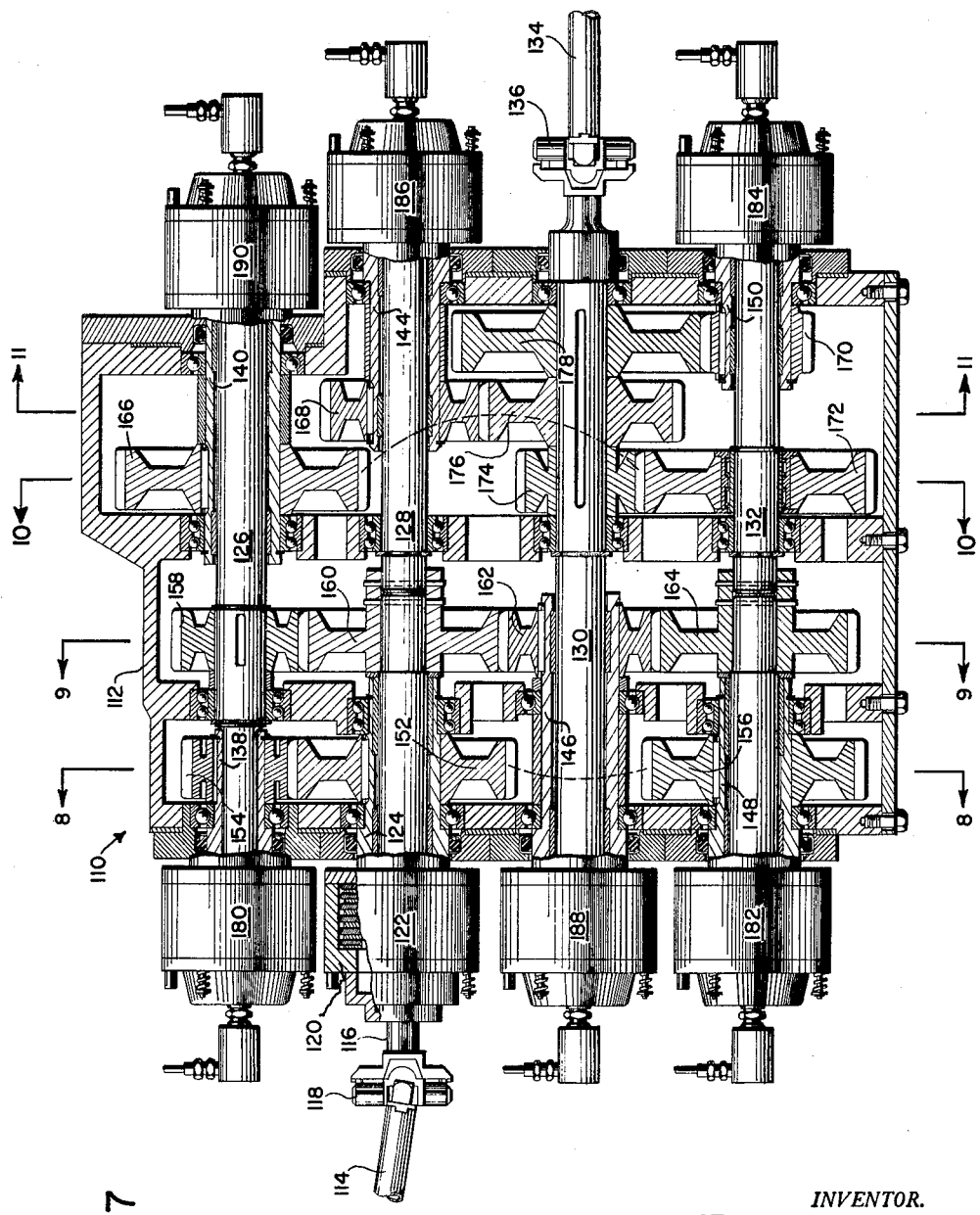

*INVENTOR.*
STANLEY J. PRICE JR.

March 12, 1963  S. J. PRICE, JR  3,080,767
CONSTANT MESH TRANSMISSION
Filed March 3, 1961  12 Sheets-Sheet 7

*INVENTOR.*
STANLEY J. PRICE JR.

INVENTOR.
STANLEY J. PRICE JR.

March 12, 1963 S. J. PRICE, JR 3,080,767
CONSTANT MESH TRANSMISSION
Filed March 3, 1961 12 Sheets-Sheet 10

*INVENTOR.*
STANLEY J. PRICE JR.

INVENTOR.
STANLEY J. PRICE, JR.

United States Patent Office 3,080,767
Patented Mar. 12, 1963

3,080,767
CONSTANT MESH TRANSMISSION
Stanley J. Price, Jr., Pittsburgh, Pa., assignor to Consolidation Coal Company, Pittsburgh, Pa., a corporation of Pennsylvania
Filed Mar. 3, 1961, Ser. No. 93,270
20 Claims. (Cl. 74—360)

This invention relates to a constant mesh transmission and more particularly to a constant mesh transmission having a plurality of speeds in both directions.

Specifically, this invention is an improvement of the hydraulically controlled transmission disclosed in Patent No. 2,712,245 dated July 5, 1955, issued to Arthur L. Lee.

This application is a continuation-in-part of application Serial Number 837,086 filed August 31, 1959, now abandoned, which is in turn a continuation in part of application Serial Number 655,605, filed April 29, 1957, now abandoned.

The transmission shown and described in the above named Lee patent has three speeds in the forward direction and three speeds in the reverse direction. This speed arrangement has proved very satisfactory in haulage type vehicles that are employed in shuttle type haulage work at the same job site for extended periods of time. The present invention is an improvement of the above named transmission in that the present invention adds additional speeds in both directions to the transmission. These additional speeds make the improved transmission more suitable for use with haulage vehicles that are required to frequently travel from one job site to another and also perform shuttle type haulage work at the various job sites. The improved transmission herein disclosed is especially useful in tractors or front end loaders that require a plurality of work speeds in both directions and additional travel speeds in one direction. Although I have added a plurality of speeds to the transmission disclosed in Patent No. 2,712,245, it should be noted that other meritorious features such as the constant mesh gearing and the external clutches taught by Lee are still retained in my improved transmission.

The principal object of this invention is to provide a constant mesh transmission having a plurality of speeds in both directions and a plurality of speed ranges in one direction.

Another object of this invention is to provide a constant mesh transmission having the greatest possible number of clutch elements external to the transmission housing.

Another object of this invention is to provide a constant mesh transmission that utilizes the driving connections between the directional gears and the change speed gears to provide an additional range of speeds in a given direction.

This invention comprises the new and improved construction and combination of parts and their operating relation to each other which will be described more fully hereinafter and the novelty of which will be particularly pointed out and distinctly claimed.

In the accompanying drawings to be taken as part of this specification, there is clearly and fully illustrated several embodiments of my invention, in which drawings:

FIGURE 7 is a developed longitudinal section similar to FIGURE 3 of another embodiment of my invention showing the transmission gears and the associated control clutches.

FIGURES 8, 9, 10 and 11 are cross sectional views taken along the respective lines 8—8, 9—9, 10—10 and 11—11 of FIGURE 7.

Figure 1:
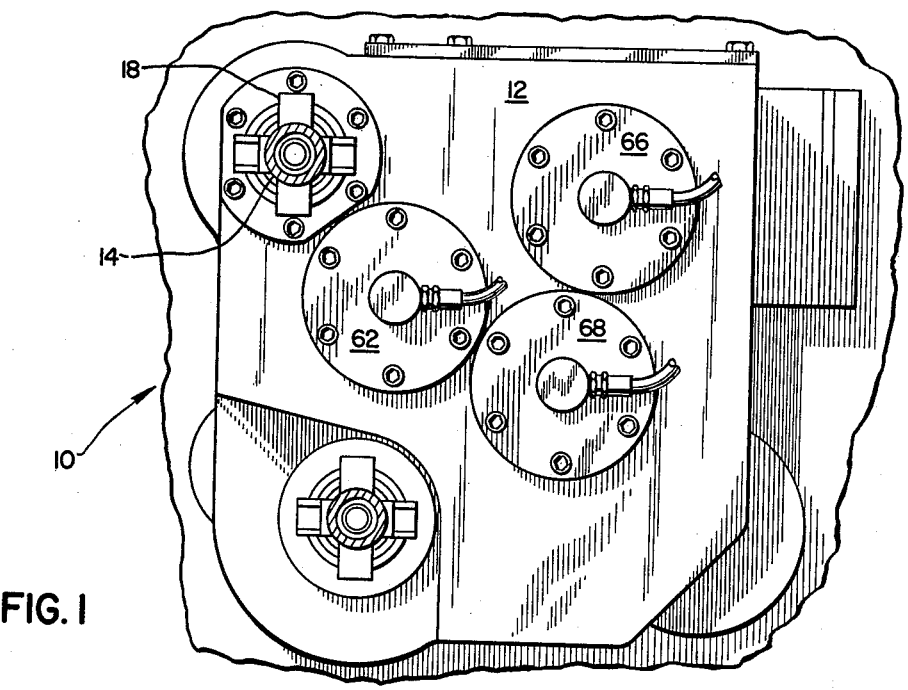
FIGURE 1 is an end elevational view of a preferred form of the improved transmission mechanism.
Figure 2:
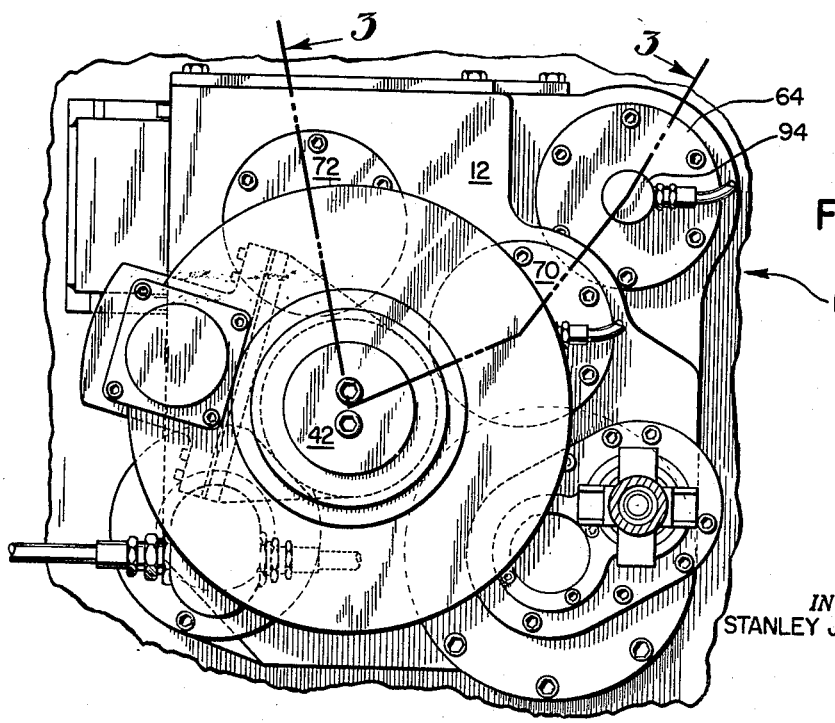
FIGURE 2 is an elevational view looking toward the opposite end of the transmission mechanism from that shown in FIGURE 1.
Figure 3:
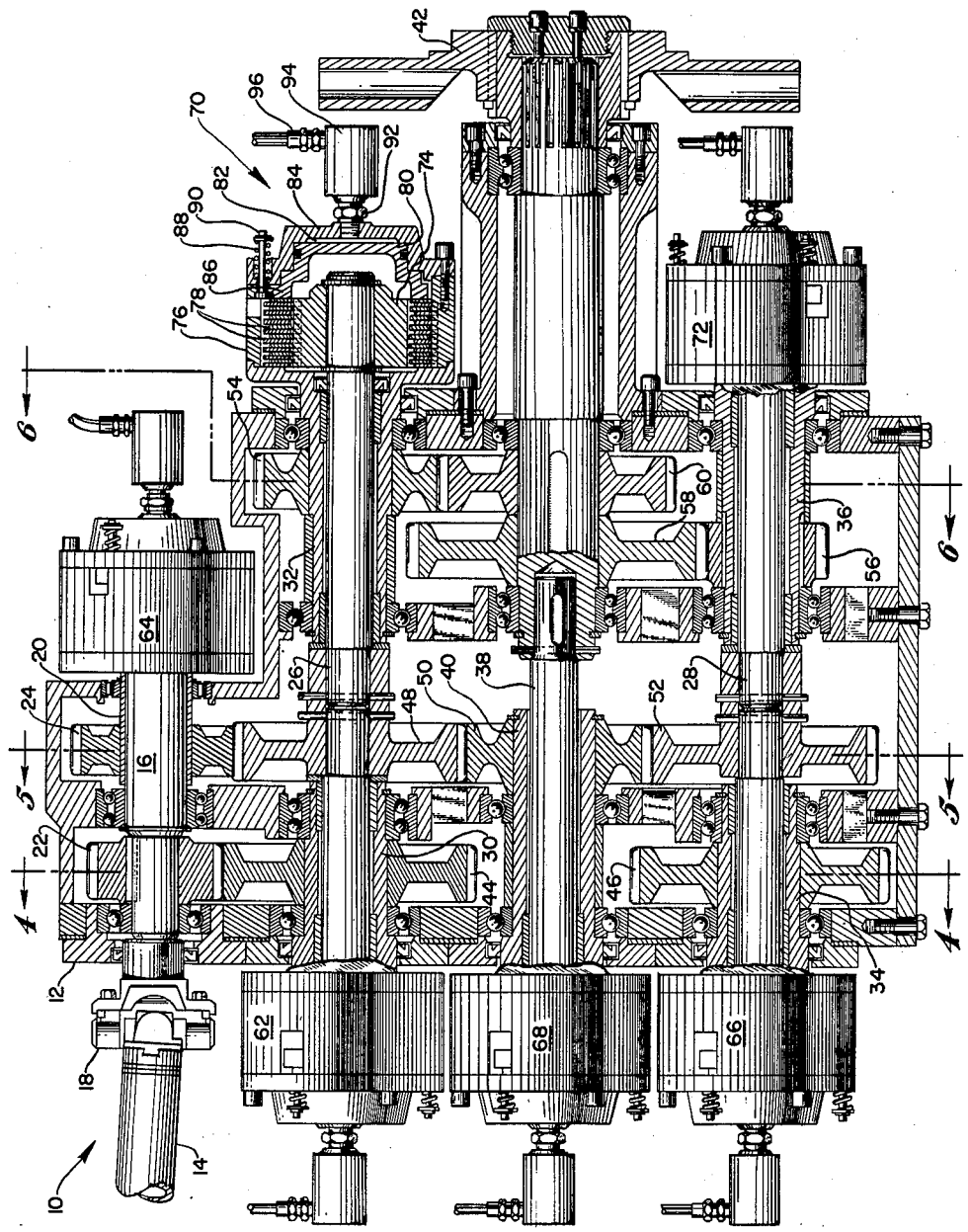
FIGURE 3 is a developed longitudinal section taken along the line 3—3 of FIGURE 2, showing the transmission gears and the associated control clutches.
Figure 12:
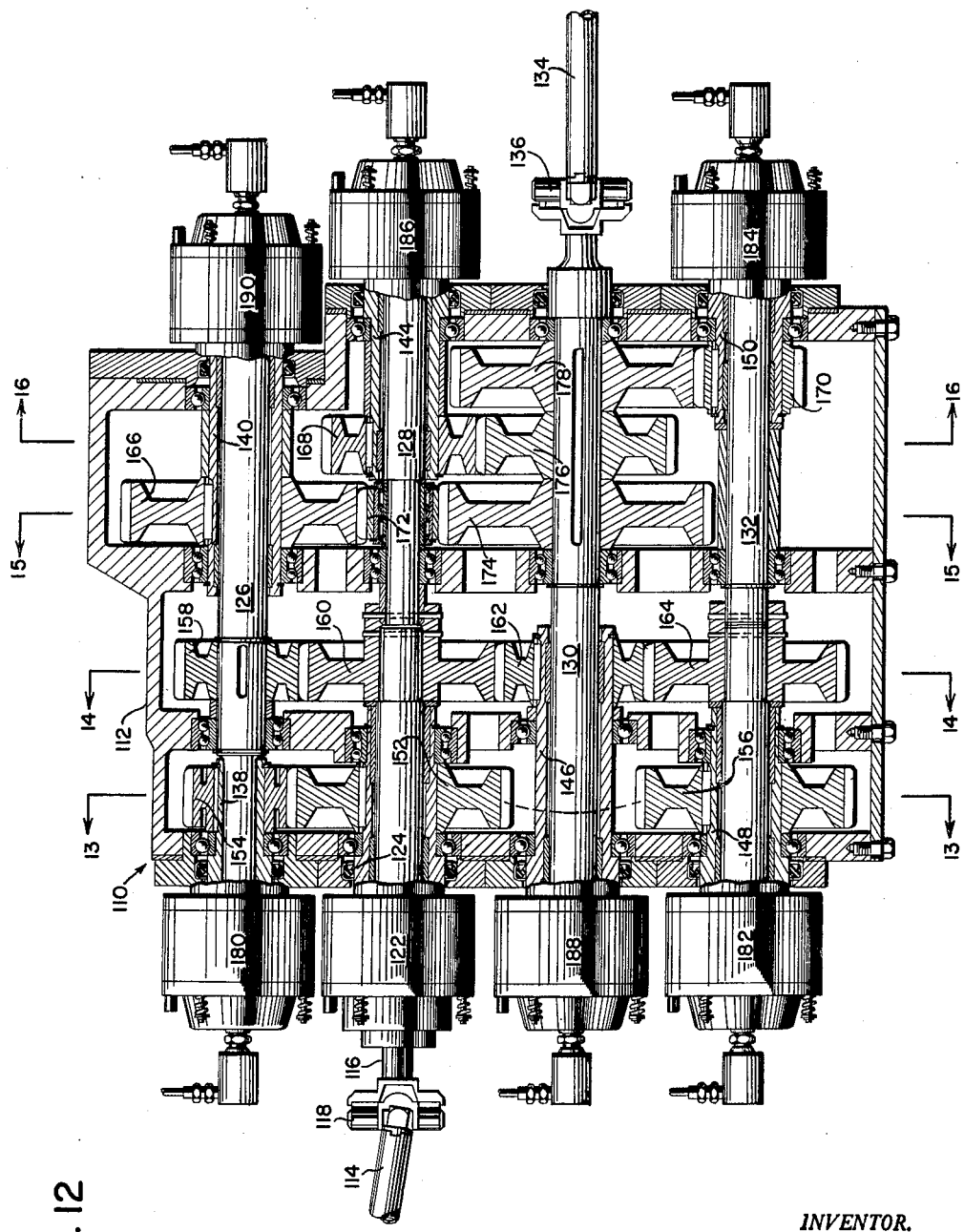
Figure 13:
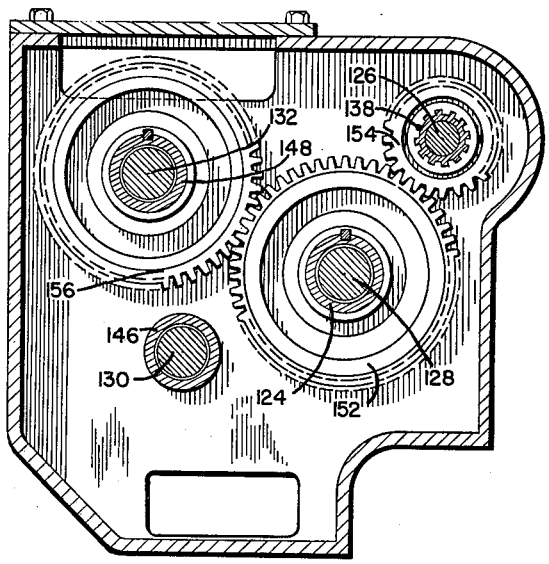
Figure 14:
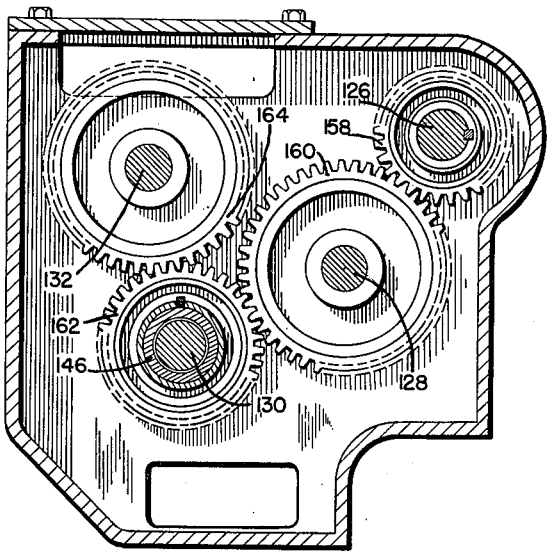
Figure 15:
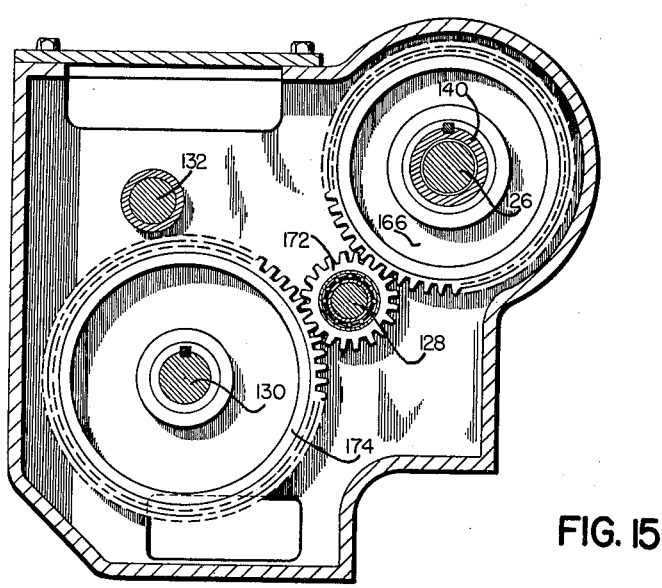
Figure 16:
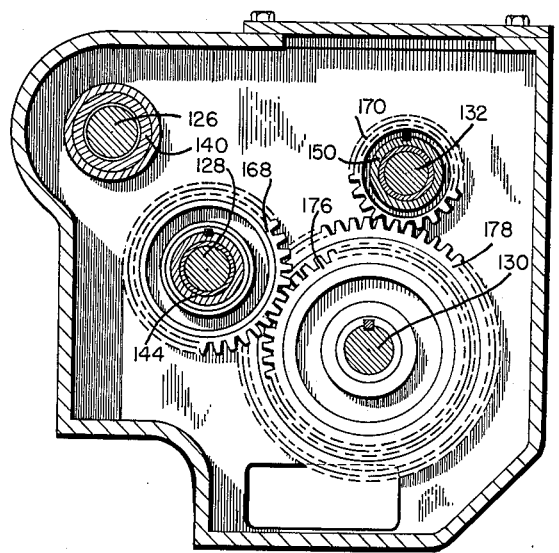

FIGURE 12 is a developed longitudinal section similar to FIGURE 3 of a third embodiment of my invention showing the transmissoin gears and associated control clutches.

FIGURES 13, 14, 15 and 16 are cross sectional views taken along the lines 13—13, 14—14, 15—15 and 16—16 of FIGURE 12.

Figure 17:
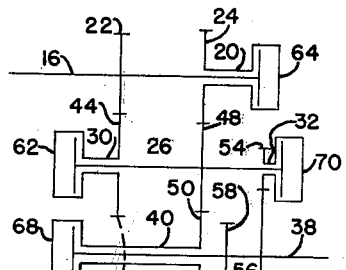

FIGURE 17 is a schematic illustration of the embodiment of my transmission shown in FIGURES 1-6.

Figures 18, 19:
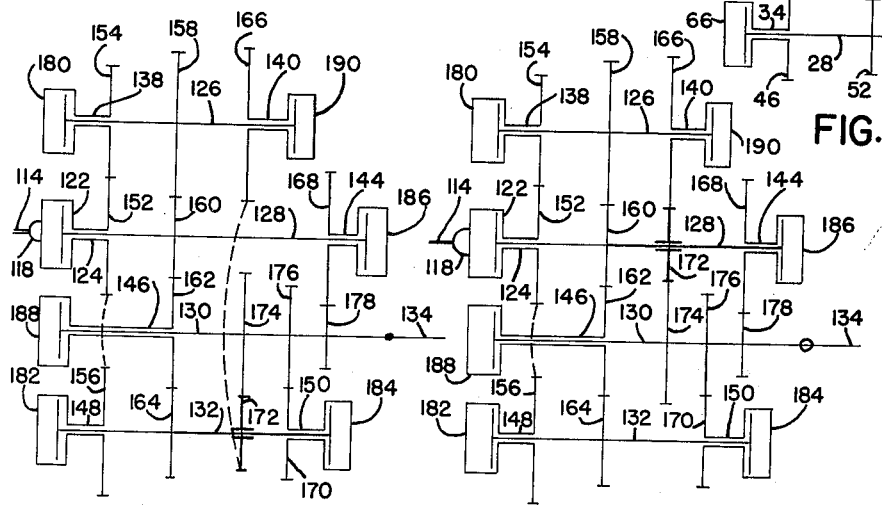

FIGURE 18 is a schematic illustration of the embodiment illustrated in FIGURES 7-11.

FIGURE 19 is a schematic illustration of the embodiment illustrated in FIGURES 12-16.

Figure 20:
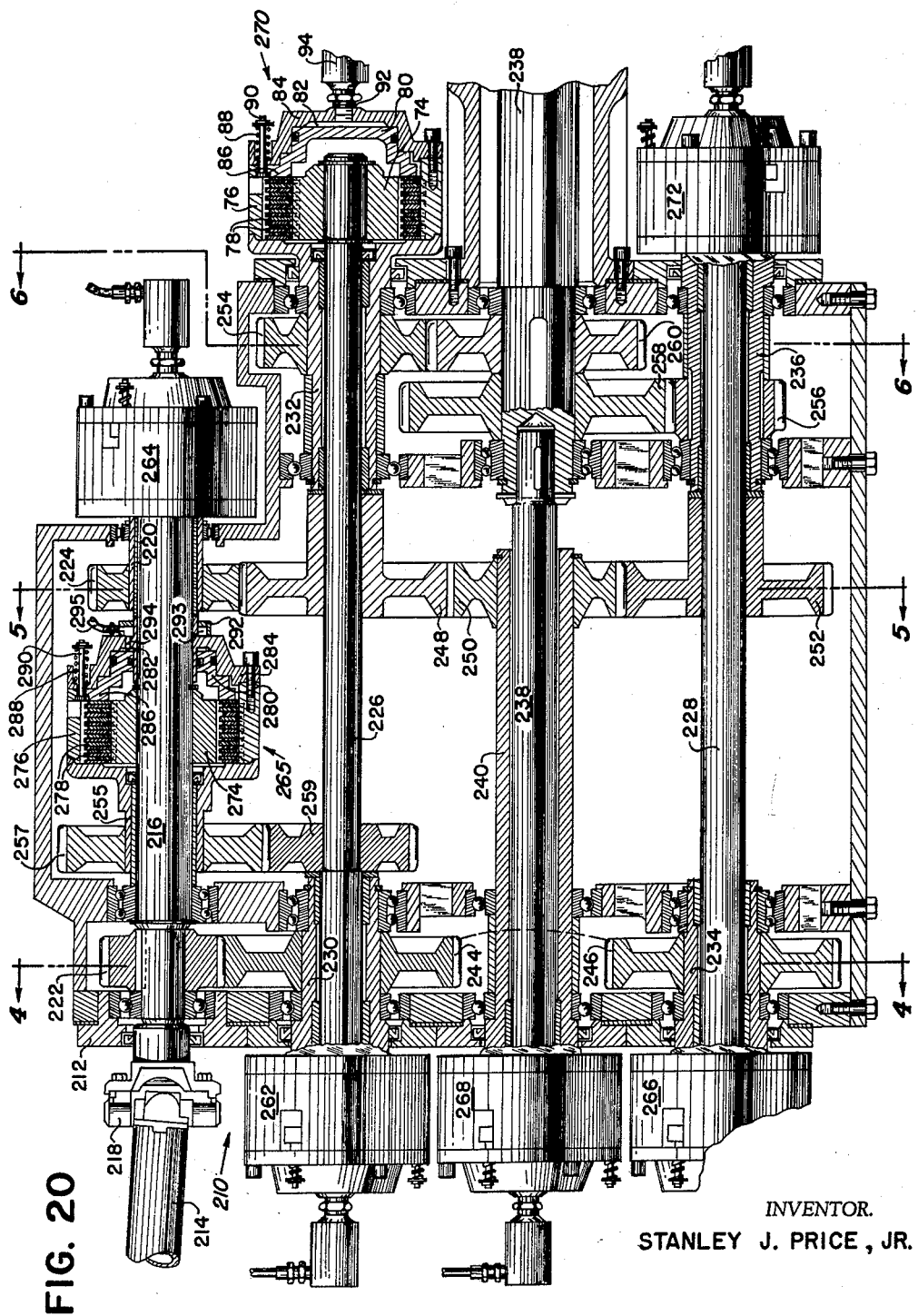

FIGURE 20 is a developed longitudinal section similar to FIGURE 3 of a fourth embodiment of my invention showing the transmission gears and associated control clutches.

Figure 21:
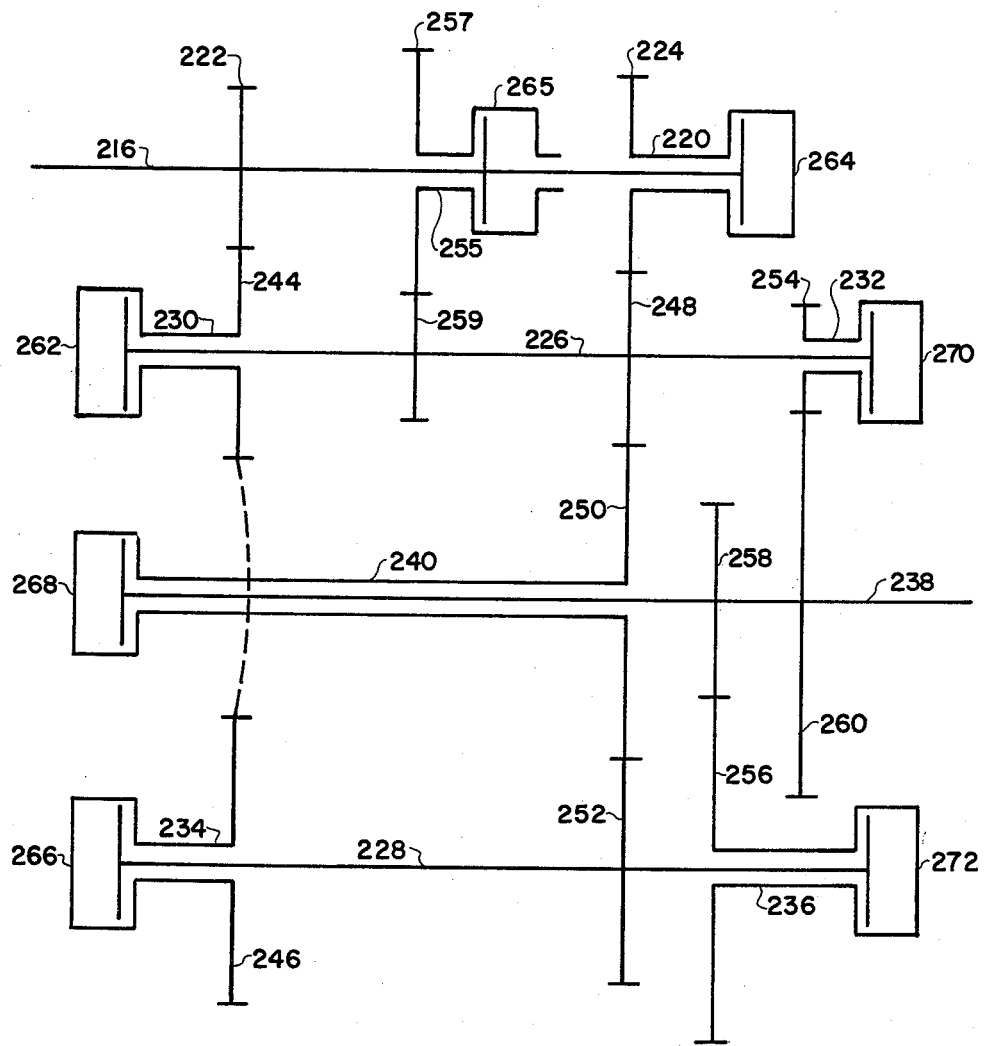

FIGURE 21 is a schematic illustration of the embodiment illustrated in FIGURES 20 and 4-6.

EMBODIMENT ILLUSTRATED IN FIGURES 1-6 AND 17

Referring to FIGURES 3 and 17 the improved transmission mechanism generally designated by the numeral 10 has a housing 12 adapted to contain a lubricant bath and enclosing transmission gearing embodying constant meshing gears which rotate in the lubricant bath. A prime mover (not shown) drives a propeller shaft 14 which is connected to an input shaft 16 by means of a universal connection 18. The prime mover employed is preferably unidirectional so that the input shaft 16 rotates in the same direction irrespective of the direction of rotation of the output shaft.

The input shaft 16 is arranged within the housing 12 and is suitably journaled for rotation therein. A tubular shaft 20 is arranged coaxially on the input shaft 16 and is rotatable relative thereto. Both the input shaft 16 and the tubular shaft 20 extend beyond the side wall of the housing 12 for reasons later explained. A spur gear 22 is keyed or otherwise rigidly secured to and rotatable with the input shaft 16. A high range forward directional spur gear 24, which is larger in size than spur gear 22, is coaxially arranged on and rigidly secured to the tubular shaft 20.

A pair of countershafts 26 and 28 are arranged within the housing 12 in spaced parallel relation to each other and to the input shaft 16. The countershafts 26 and 28 are suitably journaled for rotation within the housing 12 and have their end portions extending through the side walls of the housing 12. The countershaft 26 has a pair of tubular shafts 30 and 32 arranged coaxially thereon in rotatable relation thereto. The countershaft 28 also has a pair of similarly arranged tubular shafts 34 and 36. Each of the tubular shafts 30, 32, 34 and 36 have an end portion extending beyond a side wall of the housing 12.

An output shaft 38 is arranged parallel to the countershafts 26 and 28 and has a tubular shaft 40 coaxially positioned thereon adjacent one end. Similar to the countershafts 26 and 28, the end portions of output shaft 38 extend through the side walls of the housing 12. A brake element 42 is secured to one end of the output shaft 38. Although not illustrated in the drawings, it is within the scope of this invention to employ the end portion of the output shaft 38 having the brake element 42 mounted thereon as the power offtake means which may be suitably connected to elements driven by the transmission 10.

A low range forward directional spur gear 44 is keyed to the tubular shaft 30 coaxially positioned on countershaft 26. The low range forward directional spur gear 44 is in meshing relation with the spur gear 22 secured to the input shaft 16 and arranged to rotate in a direction opposite to the direction of spur gear 22. A reverse directional gear 46 is keyed to the tubular shaft 34 which is coaxially positioned on countershaft 28. Reverse directional gear 46 is in meshing relation with the low range forward directional gear 44 and is arranged to rotate in the same direction as the spur gear 22 mounted on the input shaft 16 and in a direction opposite to that of forward low range directional gear 44. The meshing relation of gears 22, 44 and 46 is clearly illustrated in FIGURE 4 which is a sectional view in elevation taken through these gears.

An intermediate or connecting spur gear 48 is keyed to countershaft 26 and is rotatable therewith. Intermediate gear 48 is in meshing relation with forward high range directional spur gear 24. A high speed change speed gear 50 is keyed to tubular shaft 40 which is coaxially positioned on output shaft 38. Change speed gear 50 is in meshing relation with intermediate spur gear 48 and is arranged to rotate in a direction opposite to that of intermediate spur gear 48. Another intermediate spur gear 52 is keyed to countershaft 28 and is rotatable therewith. High speed change speed gear 50 is in meshing relation with intermediate gears 48 and 52 and serves to transmit drive in a given direction from either intermediate gear 48 to intermediate gear 52 or vice versa depending upon the directional clutch that is engaged. With this arrangement intermediate gears 48 and 52 always rotate in the same direction and likewise high speed change speed gear 50 and forward high range directional gear 24 are arranged to rotate in the same direction. The arrangement and meshing relation of gears 24, 48, 50 and 52 is clearly illustrated in FIGURE 5 which is a sectional view in elevation taken through the enumerated gears.

An intermediate speed change speed spur gear 54 is keyed to the tubular shaft 32 which is coaxially positioned on countershaft 26. Low speed change speed gear 56 is similarly keyed to tubular shaft 36 arranged coaxially on countershaft 28. A pair of connecting gears 58 and 60 are rigidly secured to output shaft 38 and are respectively in meshing relation with low speed change speed gear 56 and intermediate speed change speed gear 54. The arrangement and meshing relation of gears 54, 60, 58 and 56 is clearly illustrated in FIGURE 6 which is a view in section taken along the line 6—6 in FIGURE 3.

Figure 6:
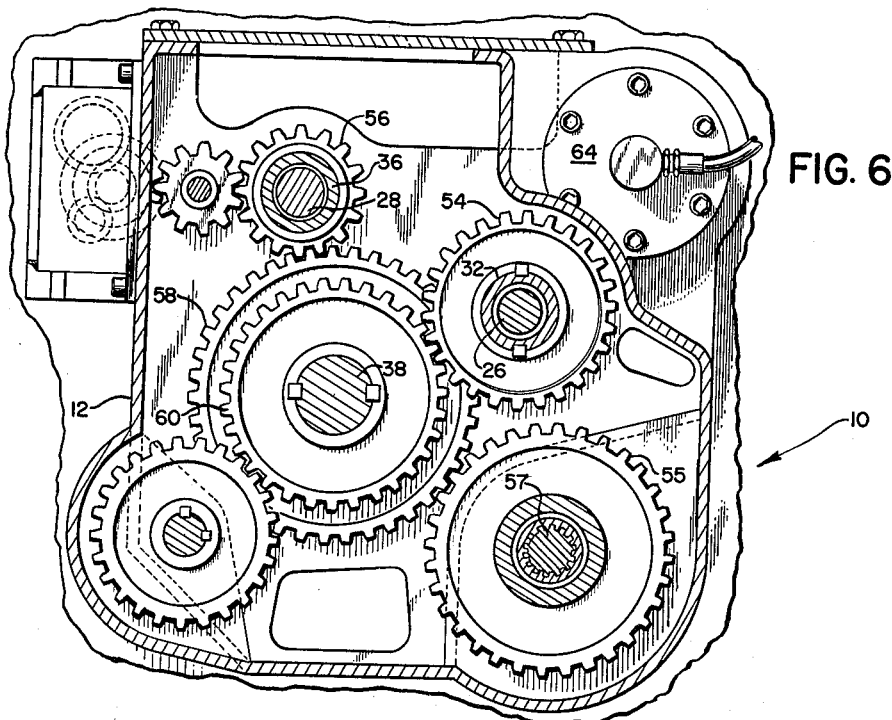
FIGURE 6 is a view taken along the line 6—6 of FIGURES 3 and 20.

As shown in FIGURE 6, a terminal element or output gear 55 is splined to an auxiliary output shaft 57 and is in meshing relation with connecting gear 58. The terminal element 55 is arranged to be driven by the connecting gear 58 and the auxiliary output shaft 57 may be arranged to be connected to elements driven by the transmission 10. Thus either the output shaft 38 or the auxiliary output shaft 57 may be connected to elements driven by the transmission 10.

Arranged exteriorly of the housing 12 there are the following clutches.

Directional clutches:
62—forward low range clutch 62 which frictionally engages tubular shaft 30 to countershaft 26;
64—forward high range clutch which is arranged to frictionally engage the tubular shaft 20 to the input shaft 16;
66—reverse directional clutch which is arranged to frictionally engage the tubular shaft 34 to the countershaft 28.

Change speed clutches:
68—high speed change speed clutch which is arranged to frictionally engage tubular shaft 40 to output shaft 38;
70—intermediate speed change speed clutch which is arranged to frictionally engage tubular shaft 32 to countershaft 26;
72—low speed change speed clutch which is arranged to frictionally engage tubular shaft 36 to countershaft 28.

The above enumerated clutches are of the hydraulically operated, multi-disc type and are arranged exteriorly of the transmission housing for ready accessibility. For illustration, the intermediate speed change speed clutch 70 is shown in section of FIGURE 3. Each clutch includes an inner member 74 keyed to the inner shaft, which in the sectional illustration is countershaft 26, and an outer rotatable clutch casing 76 secured to the outer tubular shaft. The member 74 and the casing 76 carry interleaved clutch discs or plates 78 which when pressed together serve to frictionally connect or engage the inner and outer shafts for rotation together. A piston 80 is received in a cylinder bore 82 formed within an end enclosure 84 of the outer rotatable clutch casing 76. The piston 80 has a clutch operating portion 86 which abuts the discs 78 and is adapted to move the discs into a clutch engaged position. The piston 80 is normally held in a retracted or clutch disengaged position by means of the springs 88 which act on the bolts 90. The closure member 84 has an element 92 of a conventional fluid swivel 94 connected thereto and an outer element 98 of the swivel is coupled to a fluid conduit. The fluid conduit and swivel coupling 94 is arranged to supply fluid under pressure to the cylinder bore 82. When fluid under pressure is supplied to the cylinder bore 82 the fluid pressure moves the piston 80 until the clutch operating portion 86 moves the clutch discs 78 into frictional engagement. In the absence of fluid under pressure within the cylinder bore 82 the springs 88 retract the piston 80 and release the interleaved clutch discs 78.

OPERATION

The transmission 10 illustrated in FIGURES 1–6 and 17 is capable of providing six speeds in the forward direction and three speeds in the reverse direction. The rotation of input shaft 16 energizes or drives spur gear 22 which because of the meshing relation in turn drives forward low range directional gear 44 and reverse directional gear 46. When the directional clutches 62, 64 and 66 are disengaged the only active gears in the transmission are spur gear 22 and low range directional gear 44 and reverse directional gear 46.

Upon engagement of either forward low range clutch 62, forward high range clutch 64 or reverse clutch 66, the intermediate gears 48 and 52 are activated and rotate. Rotation is provided to the intermediate or connecting gears 48 or 52 in the following manner. Engagement of forward low range clutch 62 activates countershaft 26 by means of frictionally engaging friction shaft 30 thereto. Since forward low range gear 44 is active and tubular shaft 30 is active the engagement of forward low range clutch 62 then activates countershaft 26 in a given direction. Countershaft 26 in turn activates connecting gear 48 so that the gear train 48, 50 and 52 and countershaft 28 are activated. Similarly when reverse directional clutch 66 is engaged, countershaft 28 is activated by means of the frictional engagement between countershaft 28 and tubular shaft 34. It should be noted, however, since directional gear 46 rotates in a direction opposite to that of directional gear 44, countershaft 28, when reverse directional clutch 66 is engaged, will also rotate in a direction opposite to its direction of rotation when low range directional clutch 62 is engaged. The activation of countershaft 28 by reverse directional clutch 66 in turn activates the gear train 48, 50 and 52 and countershaft 26 in the reverse direction. The output shaft 38 may then be activated at predetermined speeds by engagement of any of the change speed clutches 68, 70 or 72. Thus in either low range forward or reverse the torque is supplied from the input shaft 16, through directional spur gears 44 and 46 to the countershafts 26 and 28.

When the high range forward clutch 64 is engaged, and the other directional clutches 62 and 66 are disengaged torque is transmitted from the input shaft 16 to the countershafts 26 and 28 through directional spur gear 24 to the gear train 48, 50 and 52. Thus, although directional spur gears 44 and 46 are continuously active, when the high range forward clutch is engaged, they are not supplying driving torque to the countershafts 26 and 28.

The various clutch engagements required and the various gearing steps in the direction and speed ratios are as follows.

*Forward—low range—low speed*
    Clutches engaged—62 and 72:
        Power is transmitted through the following gears, shafts and clutches: input shaft 16, spur gears 22 and 44, tubular shaft 30, forward low range directional clutch 62, countershaft 26, spur gears 48, 50 and 52, countershaft 28, low range change speed clutch 72, tubular shaft 36, gears 56 and 58, and output shaft 38.

*Forward—low range—intermediate speed*
    Clutches engaged—62 and 70:
        Power is transmitted through the following gears, shafts and clutches: input shaft 16, gears 22 and 44, tubular shaft 30, forward low range directional clutch 62, countershafts 26, intermediate change speed clutch 70, tubular shaft 32, gears 54 and 60, and output shaft 38.

*Forward—low range—high speed*
    Clutches engaged—62 and 68:
        Power is transmitted through the following gears, shafts and clutches: input shaft 16, spur gears 22 and 44, tubular shaft 30, forward low range clutch 62, countershaft 26, spur gears 48 and 50, tubular shaft 40, high speed change speed clutch 68, and output shaft 38.

*Forward—high range—low speed*
    Clutches engaged—64 and 72:
        Power is transmitted through the following gears, shafts and clutches: input shaft 16, forward high range clutch 64, tubular shaft 20, gears 24, 48, 50 and 52, countershaft 28, low speed change speed clutch 72, tubular shaft 36, gears 56 and 58, and output shaft 38.

*Forward—high range—intermediate speed*
    Clutches engaged—64 and 70:
        Power is transmitted through the following gears, shafts and clutches: input shaft 16, forward high range clutch 64, tubular shaft 20, gears 24 and 48, countershaft 26, intermediate change speed clutch 70, tubular shaft 32, spur gears 54 and 60, and output shaft 38.

*Forward—high range—high speed*
    Clutches engaged—64 and 68:
        Power is transmitted through the following gears, shafts and clutches: input shaft 16, forward high range clutch 64, tubular shaft 20, spur gears 24, 48 and 50, tubular shaft 40, high speed change speed clutch 68, and output shaft 38.

*Reverse—low speed*
    Clutches engaged—66 and 72:
        Power is transmitted through the following gears and shafts: input shaft 16, spur gears 22, 44 and 46, tubular shaft 34, reverse clutch 66, countershaft 28, low speed change speed clutch 72, tubular shaft 36, spur gears 56 and 58, and output shaft 38.

*Reverse—intermediate speed*
    Clutches engaged—66 and 70:
        Power is transmitted through the following gears, shafts and clutches: input shaft 16, spur gears 32, 44 and 46, tubular shaft 34, reverse directional clutch 66, countershaft 28, spur gears 52, 50 and 48, countershaft 26, intermediate change speed clutch 70, tubular shaft 32, spur gears 54 and 60, and output shaft 38.

*Reverse—high speed*
    Clutches engaged—66 and 68:
        Power is transmitted through the following gears, shafts and clutches: input shaft 16, spur gears 22, 44 and 46, tubular shaft 34, reverse directional clutch 66, countershaft 28, spur gears 52 and 50, tubular shaft 40, high speed change speed clutch 68, and output shaft 38.

Although not specifically recited, it should be understood that the various gears are of a predetermined size and number of gear teeth to achieve the various forward speeds in both low range and high range as well as the reverse speed.

With the above described arrangement it is now possible to obtain six forward speeds and three reverse speeds by employing an input shaft 16, a pair of countershafts 26 and 28, an output shaft 38, gearing interconnecting the enumerated shafts, and various directional and change speed clutches. It should be noted also with the above described transmission that only two clutches are engaged in any on the forward or reverse speeds.

Thus, by adding tubular shaft 20, spur gear 24 and clutch 64 to the transmission disclosed in Patent No. 2,712,245, it is possible to increase the number of speeds in one direction from three to six and yet retain the meritorious features of the Lee transmission such as the constant mesh gearing and the external arrangement of the clutches.

EMBODIMENT ILLUSTRATED IN FIGURES 7–11 AND 18

Referring to the embodiment illustrated in FIGURES 7–11 and 18, the transmission generally designated by the numeral 110 has a housing 112 enclosing the transmission gearing. A prime mover (not shown) drives a propeller shaft 114 which is connected to an input shaft 116 by means of a universal connection 118. The propeller shaft 116 in turn is connected to the outer housing 120 of forward directional clutch 122 so that the housing 120 rotates with the input shaft 116. The clutch housing 120 is in turn fixedly secured to a tubular shaft 124 which is coaxially positioned on and rotatable relative to a countershaft, as will later be described.

Arranged within the housing 112 there are four countershafts 126, 128, 130 and 132 in spaced parallel relation to each other. The countershafts have their end portions extending through the side walls of the housing 112. The countershaft 130 has an output shaft 134 connected thereto by means of a universal connection 136.

The countershaft 126 has a pair of tubular shafts 138 and 140 arranged coaxially thereon in rotatable relation thereto. The countershaft 128 has a pair of tubular shafts 124 and 144 arranged coaxially thereon in rotatable relation thereto. Countershaft 130 has a tubular shaft 146 and countershaft 132 has a pair of tubular shafts 148 and 150 arranged coaxially thereon in rotatable relation thereto.

As previously described, the input shaft 116 is secured to the external housing 120 of forward directional clutch 122. The external housing 120 is in turn secured to the tubular shaft 124 which is coaxially positioned on countershaft 128. With this arrangement the rotation of input shaft 116 is transmitted through the clutch external housing 120 to the tubular shaft 124. A forward directional low range spur gear 152 is secured to and rotatable with tubular shaft 124 coaxially positioned on countershaft 128. Forward high range directional spur gear 154 is secured to and rotatable with tubular shaft 138 coaxially positioned on countershaft 126 and is in meshing relation with forward low range directional spur gear 152. Reverse directional spur gear 156 is secured to and rotatable with tubular shaft 148 positioned on countershaft 132. The reverse directional spur gear 156 is in meshing relation with forward low range directional spur gear 152. The meshing relation of spur gears 152, 154 and 156 is clearly illustrated in FIGURE 8 which is a section taken along the line 8—8 of FIGURE 7. With this arrangement the rotation of the propeller shaft 114 is transmitted through universal connection 118 to input shaft 116 which, in turn, is transmitted through low range clutch housing 120 to tubular shaft 124. Forward directional low range spur gear 152 being secured to the tubular shaft 124 in turn transmits the rotation of input shaft 116 to the directional spur gears 154 and 156.

The countershaft 126 has secured thereto and rotatable therewith a connecting spur gear 158. Similarly, countershaft 128 has a connecting spur gear 160 connected thereto and rotatable therewith. The spur gear 160 is in meshing relation with connecting spur gear 158. The tubular shaft 146 coaxially positioned on countershaft 130 has a spur gear 162 secured thereto and rotatable therewith. Countershaft 132 also has a connecting spur gear 164 secured thereto and rotatable therewith. The spur gear 162 secured to tubular shaft 146 is in meshing relation with spur gears 160 and 164. The meshing relation of the connecting spur gears 158, 160, 162 and 164 is clearly illustrated in FIGURE 9 which is a view taken along the line 9—9 in FIGURE 7.

With the above gear arrangement when any of the directional clutches are engaged, as will later be explained, the countershafts 126, 128 and 132, through the meshing arrangement of connecting gears 158, 160, 162 and 164, will rotate in a predetermined direction depending upon which directional clutch is engaged. Although the spur gear 162 is referred to as a connecting gear, it also functions as a change speed gear.

The tubular shaft 140 coaxially positioned on countershaft 126 has a change speed spur gear 166 secured thereto and rotatable therewith. The tubular shaft 144 coaxially positioned on countershaft 128 has a change speed spur gear 168 secured thereto and rotatable therewith. Tubular shaft 150 coaxially positioned on countershaft 132 has another change speed gear 170 secured thereto and rotatable therewith. Countershaft 132 also has an intermediate spur gear 172 coaxially positioned thereon and rotatable relative thereto. The countershaft 130, which has output shaft 134 connected thereto, has power transmitting gears 174, 176 and 178 secured to and rotatable therewith.

Change speed spur gear 166 meshes with intermediate gear 172 which in turn is in meshing relation with power transmitting gear 174 secured to countershaft 130. Change speed gear 168 is in meshing relation with power transmitting gear 176 and change speed gear 170 is in meshing relation with power transmitting gear 178. The meshing relation of change speed gear 166 with intermediate gears 172 and 174 is clearly disclosed in FIGURE 10 which is a view in section taken along line 10—10 of FIGURE 7. The meshing relation of change speed gears 168 and 170 with power transmitting gears 178 and 176 is clearly illustrated in FIGURE 11 which is a view in section taken along the line 11—11 of FIGURE 7.

Arranged externally of the transmission housing 112 are the following clutches.

Directional clutches:
  Forward low range directional clutch 122
  Forward high range directional clutch 180
  Reverse directional clutch 182

Change speed clutches:
  Low speed clutch 184
  Intermediate speed clutch 186
  High speed clutch 188
  Top speed clutch 190

The above enumerated clutches are of the hydraulically operated multi-disc type and are arranged exteriorly of the transmission for ready accessibility and are similar to the intermediate change speed clutch 70 shown in section in FIGURE 3. The respective clutches are arranged to frictionally engage the respective countershaft to the tubular shaft coaxially positioned thereon. As an example, the engagement of forward low range directional clutch 122 frictionally engages countershaft 128 to tubular shaft 124.

OPERATION

The transmission 110 is capable of providing eight speeds in the forward direction and four speeds in the reverse direction. The rotation of input shaft 116 is transmitted through clutch housing 120 to tubular shaft 124 and forward directional low range spur gear 152. Because of the meshing relation of the directional spur gears, gears 154 and 156 are also rotating in a predetermined direction. It should be noted, however, that the countershafts 126, 128, 130 and 132 remain inactive until a directional clutch is engaged.

Upon engagement of any of the recited directional clutches 122, 180 or 182, in addition to the directional spur gears 152, 154 and 156, the countershafts 126, 128 and 132 are activated through the connecting gears 158, 160, 162 and 164. It should be noted, however, that the output shaft 134 and countershaft 130 remain inactive until a change speed clutch is engaged.

Upon engagement of certain change speed clutches the rotation of the respective countershafts 126, 128 and 132 is transmitted through the change speed gears and power transmitting gears 174, 176 and 178 to countershaft 130 and thence to output shaft 134. In other instances, as will later be explained, power is transmitted either directly to the countershaft 130 and thence to output shaft 134, or in another instance power is transmitted from a change speed gear 166 through an intermediate gear 172 to a power transmitting gear 174 secured on countershaft 130.

The various clutch engagements required and the various gearing steps in the direction and speed ratios are as follows:

*Forward—low range—low speed*
  Clutches engaged—122 and 184:
    Power is transmitted through the following gears, shafts and clutches; input shaft 116, clutch housing 120, tubular shaft 124, forward low range clutch 122, countershaft 128, connecting gears 160, 162, 164, countershaft 132, low speed clutch 184, tubular shaft 150, change speed gear 170, power transmitting gear 178, countershaft 130 and output shaft 134.

*Forward—low range—intermediate speed*
  Clutches engaged—122 and 186:
    Power is transmitted as follows: input shaft 116, clutch housing 120, tubular shaft 124, clutch 122, countershaft 128, clutch 186, tubular shaft 144, change speed gear 168, power transmitting gear 176, countershaft 130, output shaft 134.

*Forward—low range—high speed*
  Clutches engaged—122 and 188:
    Power is transmitted as follows: input shaft 116, clutch housing 120, tubular shaft 124, forward low range clutch 122, countershaft 128, connecting gears 160 and 162, tubular shaft 146, high speed clutch 188, countershaft 130 to output shaft 134.

*Forward—low range—top speed*
  Clutches engaged—122 and 190:
    Power is transmitted as follows: input shaft 116 clutch housing 120, tubular shaft 124, forward low range directional clutch 122, countershaft 128, connecting gears 160 and 158, counter shaft 126, top speed clutch 190, tubular shaft 140, change speed spur gear 166, intermediate gear 172, power transmitting gear 174 countershaft 130 to output shaft 134.

*Forward—high range—low speed*
  Clutches engaged—180 and 184:
    Power is transmitted as follows: input shaft 116, clutch housing 120, tubular shaft 124, directional spur gears 152 and 154, tubular shaft 138, forward high range clutch 180, countershaft 126, connecting gears 158, 160, 162 and 164, countershaft 132, low speed clutch 184, tubular shaft 150, change speed gear 170, power transmitting gear 178, countershaft 130 to output shaft 134.

*Forward—high range—intermediate speed*
  Clutches engaged 180 and 186:
    Power is transmitted as follows: input shaft 116, clutch housing 120, tubular saft 124, directional spur gears 152 and 154, tubular shaft 138, forward high range directional clutch 180, counter shaft 126, connecting gears 158 and 160, countershaft 128, intermediate speed clutch 186, tubular shaft 144, change speed gear 168, power transmitting gear 176, countershaft 130 to output shaft 134.

*Forward—high range—high speed*
  Clutches engaged—180 and 188:
    Power is transmitted as follows: input shaft 116, clutch housing 120, tubular shaft 124, directional spur gears 152 and 154, tubular shaft 138, forward high range directional clutch 180, countershaft 126, connecting gears 158, 160 and 162, tubular shaft 146, high speed clutch 188, countershaft 130 to output shaft 134.

*Forward—high range—top speed*
  Clutches engaged—180 and 190:
    Power is transmitted as follows: input shaft 116, clutch housing 120, tubular shaft 124, directional spur gears 152, 154, tubular shaft 138, forward high range directional clutch 180, countershaft 126, forward top speed clutch 190, tubular shaft 140, change speed gear 166, intermediate gear 172, power transmitting gear 174, countershaft 130 to output shaft 134.

*Reverse—low speed*
  Clutches engaged—182 and 184:
    Power is transmitted as follows: input shaft 116, clutch housing 120, tubular shaft 124, forward directional spur gear 152, reverse directional spur gear 156, tubular shaft 148, reverse directional clutch 182, counter shaft 132, low speed clutch 184, tubular shaft 150, change speed gear 170, power transmitting gear 178, countershaft 130 to output shaft 134.

*Reverse—intermediate speed*
  Clutches engaged—182 and 186:
    Power is transmitted as follows: input shaft 116, clutch housing 120, tubular shaft 124, forward directional spur gear 152, reverse directional spur gear 156, tubular shaft 148, reverse directional clutch 182, countershaft 132, connecting gears 164, 162 and 160, countershaft 128, intermediate speed clutch 186, tubular shaft 144, change speed gear 168, power transmitting gear 176, counter shaft 130 to output shaft 134.

*Reverse—high speed*
  Clutches engaged—182 and 188:
    Power is transmitted as follows: input shaft 116, clutch housing 120, tubular shaft 124, forward directional spur gear 152, reverse directional spur gear 156, tubular shaft 148, reverse directional clutch 182, countershaft 132, connecting gears 164, 162, tubular shaft 146, high speed clutch 188, countershaft 130 to output shaft 134.

*Reverse—top speed*
  Clutches engaged—182 and 190:
    Power is transmitted as follows: input shaft 116, clutch housing 120, tubular shaft 124, forward directional spur gear 152, reverse directional spur gear 156, tubular shaft 148, reverse directional clutch 182, counter shaft 132, connecting gears 164, 162, 160, 158, countershaft 126, top speed clutch 190, tubular shaft 140, change speed gear 166, intermediate gear 172, power transmitting gear 174, countershaft 130 to output shaft 134.

As previously stated in regard to the embodiment illustrated in FIGURES 1–6 and 17, it should be understood that the various gears are of a predetermined size to achieve the various forward speeds in both low and high range as well as the reverse speed.

With the above described arrangement, it is now possible to obtain eight forward speeds and four reverse speeds by employing four countershafts, three directional clutches and four change speed clutches. With this above described transmission only two clutches are engaged in any of the forward and reverse speeds.

The embodiment illustrated in FIGURES 12–16 and 19 is similar in many respects to the embodiment of FIGURE 7, and the same numerals designate the same parts. In the embodiment illustrated in FIGURE 12, however, the intermediate gear 172 is coaxially positioned on countershaft 128 instead of countershaft 132, as illustrated in FIGURE 7. The meshing relation of gears 166, 172, and 174 is clearly shown in FIGURE 15 which is a sectional view taken along the line 15—15 of FIGURE 12.

By way of example, the embodiment illustrated in FIGURES 12–15 operates as follows.

*Forward—low range—top speed*
  Clutches engaged—122 and 190:
    Power is transmitted as follows: input shaft 116, through clutch housing 120, to tubular shaft 124, thence through forward low range clutch 122, countershaft 128, connecting gears 160, 158, countershaft 126, top speed clutch 190, tubular shaft 140, change speed spur gear 166, intermediate gear 172 coaxially and rotatably positioned on countershaft 144, power transmitting gear 174, countershaft 130, to output shaft 134.

*Forward—high range—top speed*
  Clutches engaged—180 and 190:
    Power is transmitted as follows: input shaft 116, clutch housing 120, tubular shaft 124, forward directional low range spur gear 152, forward directional high range spur gear 154, tubular shaft 138, forward high range directional clutch 180, countershaft 126, top speed clutch 190, tubular shaft 140, change speed spur gear 166, intermediate gear 172 coaxially and rotatably positioned on countershaft 144, power transmitting gear 174, countershaft 130 to output shaft 134.

*Reverse—top speed*
  Clutches engaged—182 and 190:
    Power is transmitted as follows: input shaft 116, clutch housing 120, tubular shaft 124, forward directional low range spur gear 152, reverse directional spur gear 156, tubular shaft 148, reverse directional clutch 182, countershaft 132, connecting gears 164, 162, 160, 158, countershaft 126, top speed clutch 190, tubular shaft 140, change speed spur gear 166, intermediate gear 172 coaxially and rotatably positioned on countershaft 128, power transmitting gear 174, countershaft 130 to output shaft 134 in a reverse direction.

It should be noted in the embodiments illustrated in FIGURES 7–16, 18 and 19 that a plurality of speeds, i.e. eight speeds in forward direction and four speeds in the reverse direction, are possible with four countershafts, seven clutches and fourteen spur gears. In addition, the spur gears within the transmission are all in constant meshing relation so that it is no longer necessary to stop the rotation of the countershafts so that the various change speed or directional gears may be engaged.

EMBODIMENT ILLUSTRATED IN FIGURES 20 AND 21

Figure 4:
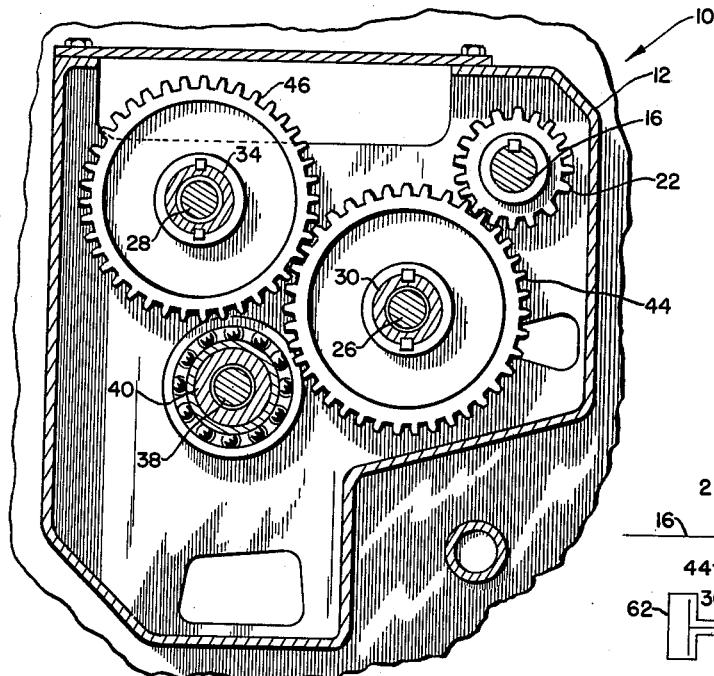
FIGURE 4 is a cross sectional view taken along the line 4—4 of FIGURES 3 and 20.
Figure 5:
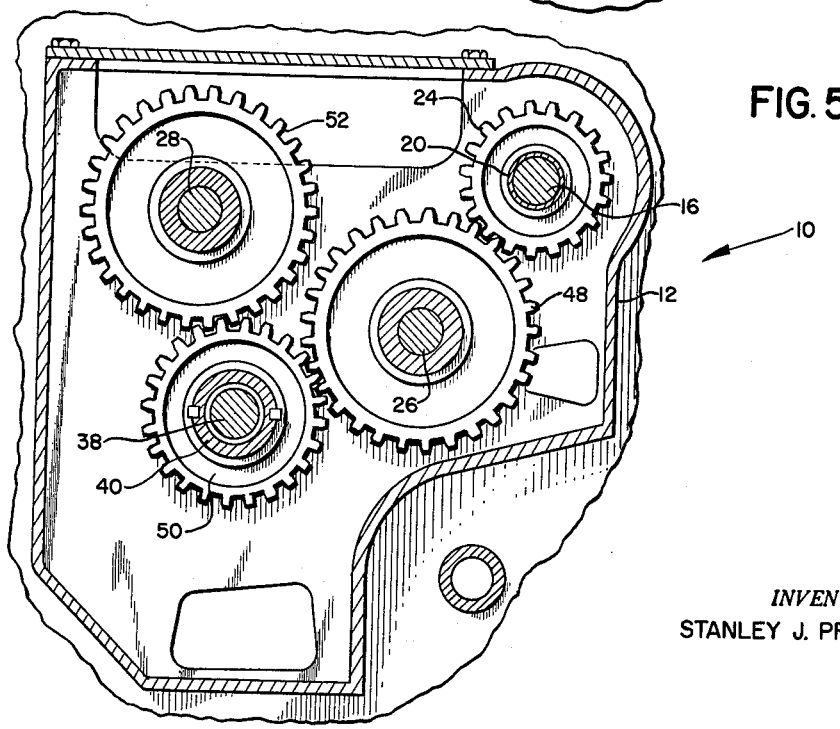
FIGURE 5 is a cross sectional view taken along the line 5—5 in FIGURES 3 and 20.
Figure 8:
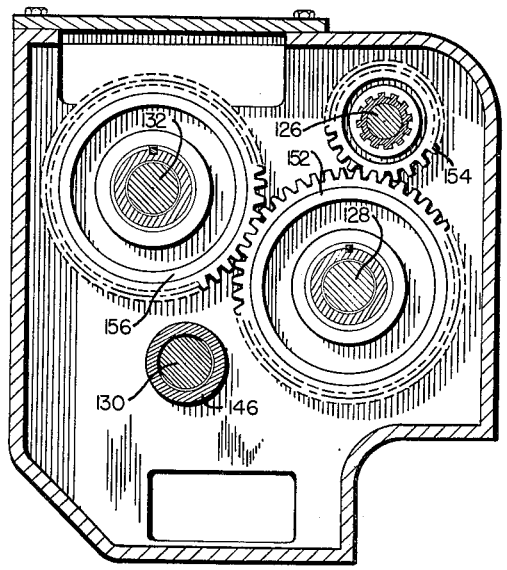
Figure 9:
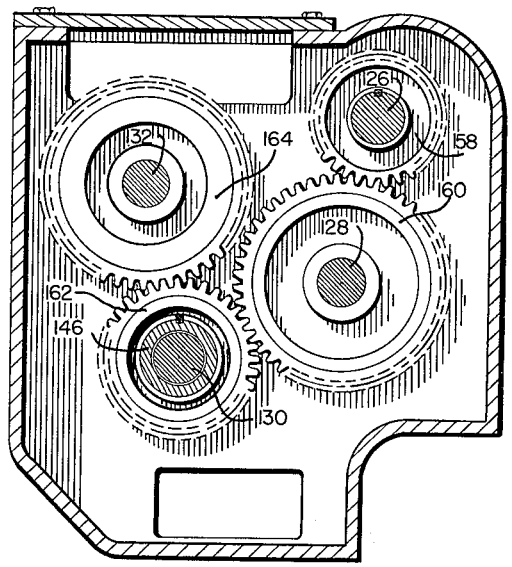
Figure 10:
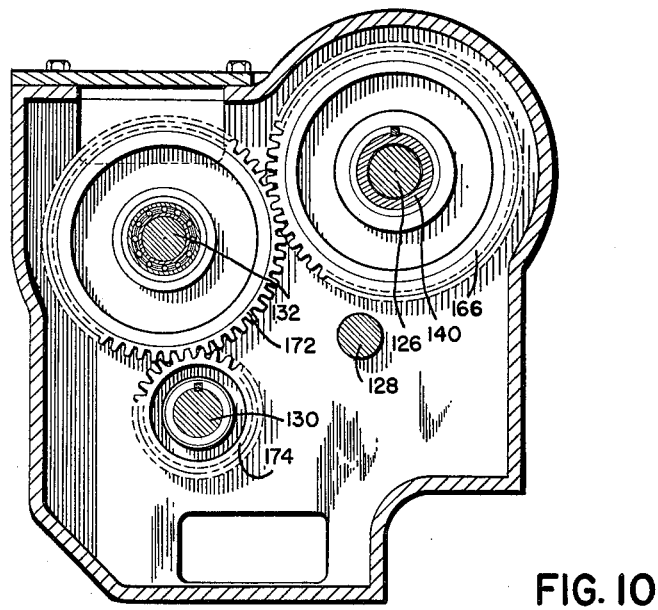
Figure 11:
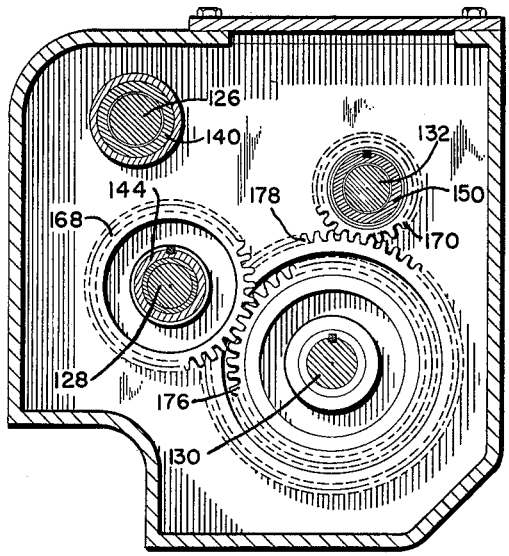

The embodiment illustrated in FIGURES 20 and 21 is generally similar to that illustrated in FIGURES 1–6 and 17 except for the addition of a third or top range clutch in one direction of operation which gives the transmission of FIGURES 20 and 21 nine speed ratios in one direction of operation and three speed ratios in the other. Because of the similarity to the embodiment of FIGURES 1–6 and 17, FIGURE 20 has lines 4—4, 5—5, and 6—6 indicated thereon to show that the cross sectional views of FIGURES 4, 5 and 6 are equally applicable to the embodiment of FIGURES 20 and 21. In FIGURES 20 and 21, the numerals indicating like parts are 200 units higher than those in FIGURES 4, 5 and 6. Thus, for example, gear 224 of FIGURES 20 and 21 is gear 24 of FIGURE 5.

Referring to FIGURES 20 and 21 the improved transmission mechanism generally designated by the numeral 210 has a housing 212 adapted to contain a lubricant bath and enclosing transmission gearing embodying constant meshing gears which rotate in the lubricant bath. A prime mover (not shown) drives a propeller shaft 214 which is connected to an input shaft 216 by means of a universal connection 218. The prime mover employed is preferably unidirectional so that the input shaft 216 rotates in the same direction irrespective of the direction of rotation of the output shaft.

The input shaft 216 is arranged within the housing 212 and is suitably journaled for rotation therein. A tubular shaft 220 is arranged coaxially on the input shaft 216 and is rotatable relative thereto. Both the input shaft 216 and the tubular shaft 220 extend beyond the side wall of the housing 212 for reasons later explained. A spur gear 222 is keyed or otherwise rigidly secured to and rotatable with the input shaft 216. A high range forward directional spur gear 224, which is larger in size than spur gear 222, is coaxially arranged on and rigidly secured to the tubular shaft 220.

A pair of countershafts 226 and 228 are arranged within the housing 212 in spaced parallel relation to each other and to the input shaft 216. The countershafts 226 and 228 are suitably journaled for rotation within the housing 212 and have their end portions extending through the side walls of the housing 212. The countershaft 226 has a pair of tubular shafts 230 and 232 arranged coaxially thereon in rotatable relation thereto. The countershaft 228 also has a pair of similarly arranged tubular shafts 234 and 236. Each of the tubular shafts 230, 232, 234 and 236 have an end portion extendnig beyond a side wall of the housing 212.

An output shaft 238 is arranged parallel to the countershafts 226 and 228 and has a tubular shaft 240 coaxially positioned thereon adjacent one end. Similar to the countershafts 226 and 228, the end portions of output shaft 238 extend through the side walls of the housing 212. Although not illustrated in the drawings, it is within the scope of this invention to employ the end portion of the output shaft 238 as the power offtake means which may be suitably connected to elements driven by the transmission 210.

A low range forward directional spur gear 244 is keyed to the tubular shaft 230 coaxially positioned on countershaft 226. The low range forward directional spur gear 244 is in meshing relation with the spur gear 222 secured to the input shaft 216 and arranged to rotate in a direction opposite to the direction of spur gear 222. A reverse directional gear 246 is keyed to the tubular shaft 234 which is coaxially positioned on countershaft 228. Reverse directional gear 246 is in meshing relation with the low range forward directional gear 244 and is arranged to rotate in the same direction as the spur gear 222 mounted on the input shaft 216 and in a direction opposite to that of forward low range directional gear 244.

An intermediate or connecting spur gear 248 is keyed to countershaft 226 and is rotatable therewith. Intermediate gear 248 is in meshing relation with forward high range directional spur gear 224. A high speed change speed gear 250 is keyed to tubular shaft 240 which is coaxially positioned on output shaft 238. Change speed gear 250 is in meshing relation with intermediate spur gear 248 and is arranged to rotate in a direction opposite to that of intermediate spur gear 248. Another intermediate spur gear 252 is keyed to countershaft 228 and is rotatable therewith. High speed change speed gear 250 is in meshing relation with intermediate gears 248 and 252 and serves to transmit drive in a given direction from either intermediate gear 248 to intermediate gear 252 or vice versa depending upon the directional clutch that is engaged. With this arrangement intermediate gears 248 and 252 always rotate in the same direction and likewise high speed change speed gear 250 and forward high range directional gear 224 are arranged to rotate in the same direction.

An intermediate speed change speed spur gear 254 is keyed to the tubular shaft 232 which is coaxially positioned on countershaft 226. Low speed change speed gear 256 is similarly keyed to tubular shaft 236 arranged coaxially on countershaft 228. A pair of connecting gears 258 and 260 are rigidly secured to output shaft 238 and are respectively in meshing relation with low speed change speed gear 256 and intermediate speed change speed gear 254.

Between spur gear 222 and the tubular shaft 220 on the input shaft 216, another tubular shaft 255 is journaled for rotation on input shaft 216. A top range forward directional spur gear 257 is nonrotatably secured to tubular shaft 255 for rotation therewith. Top range forward directional spur gear 257 is larger than high range forward directional spur gear 224 and is in meshing relation with connecting spur gear 259 nonrotatably secured to countershaft 226.

Arranged on the transmission mechanism are the following clutches.

Directional clutches:
  262—forward low range clutch 262 which frictionally engages tubular shaft 230 to countershaft 226;
  264—forward high range clutch which is arranged to frictionally engage the tubular shaft 220 to the input shaft 216;
  265—forward top range clutch which is arranged to frictionally engage the tubular shaft 255 to the input shaft 216;
  266—reverse directional clutch which is arranged to frictionally engage the tubular shaft 234 to the countershaft 228.

Change speed clutches:
  268—high speed change speed clutch which is arranged to frictionally engage tubular shaft 240 to output shaft 238;

270—intermediate speed change speed clutch which is arranged to frictionally engage tubular shaft 232 to countershaft 226.

272—low speed change speed clutch which is arranged to frictionally engage tubular shaft 236 to countershaft 228.

The above enumerated clutches are of the hydraulically operated, multi-disc type and except for forward top range clutch 265 are arranged exteriorly of the transmission housing for ready accessibility. For illustration, the intermediate speed change speed clutch 270 is shown in section in FIGURE 20. All clutches except top range clutch 265 are identical to those previously described in detail in connection with the embodiment of FIGURES 1–6 and 17. That description is deemed adequate and will not be repeated. The top range clutch 265 is slightly modified and includes an inner member 274 keyed to the input shaft 216 and an outer rotatable clutch casing 276 secured to the outer tubular shaft 255. The member 274 and the casing 276 carry interleaved clutch discs or plates 278 which when pressed together serve to frictionally connect or engage the inner and outer shafts for rotation together. An annular piston 280 is received in an annular recess 282 formed within an annular end enclosure 284 of the outer rotatable clutch casing 276. The piston 280 has a clutch operating portion 286 which abuts the discs 278 and is adapted to move the discs into a clutch engaged position. The piston 280 is normally held in a retracted or clutch disengaged position by means of the springs 288 which act on the bolts 290. The closure member 284 has an annular element 292 abutting it and rotatable relative thereto. Annular element 292 has an annular passage 293 which communicates with a passage 294 formed in closure member 284. Element 292 remains fixed as clutch casing 276 rotates so that a fluid conduit 295 may be secured thereto and communicate with annular passage 293. The fluid conduit element 292 is arranged to supply fluid under pressure to the cylinder recess 282. When fluid under pressure is supplied to the cylinder recess 282 the fluid pressure moves the piston 280 until the clutch operating portion 286 moves the clutch discs 278 into frictional engagement. In the absence of fluid under pressure within the cylinder recess 282, the springs 288 retract the piston 280 and release the interleaved clutch discs 278.

OPERATION

The operation of the transmission of FIGURES 20 and 21 is generally similar to that of FIGURES 1–6 and 17 with the additional top range in the forward direction. The various clutch engagements required and the various gearing steps in the direction and speed ratios are as follows.

*Forward—low range—low speed*
   Clutches engaged—262 and 272:
      Power is transmitted through the following gears, shafts and clutches: input shaft 216, spur gears 222 and 244, tubular shaft 230, forward low range directional clutch 262, countershaft 226, spur gears 248, 250 and 252, countershaft 228, low range change speed clutch 272, tubular shaft 236, gears 256 and 258, and output shaft 238.

*Forward—low range—intermediate speed*
   Clutches engaged—262 and 270:
      Power is transmitted through the following gears, shafts and clutches: input shaft 216, gears 222 and 244, tubular shaft 230, forward low range directional clutch 262, countershaft 226, intermediate change speed clutch 270, tubular shaft 232, gears 254 and 260, and output shaft 238.

*Forward—low range—high speed*
   Clutches engaged—262 and 268:
      Power is transmitted through the following gears, shafts and clutches: input shaft 216, spur gears 222 and 244, tubular shaft 230, forward low range clutch 262, countershaft 226, spur gears 248 and 250, tubular shaft 240, high speed change speed clutch 268, and output shaft 238.

*Forward—high range—low speed*
   Clutches engaged—264 and 272:
      Power is transmitted through the following gears, shafts and clutches: input shafts 216, forward high range clutch 264, tubular shaft 220, gears 224, 248, 250 and 252, countershaft 228, low speed change speed clutch 272, tubular shaft 236, gears 256 and 258, and output shaft 238.

*Forward—high range—intermediate speed*
   Clutches engaged—264 and 270:
      Power is transmitted through the following gears, shafts and clutches: input shaft 216, forward high range clutch 264, tubular shaft 220, gears 224 and 248, countershaft 226, intermediate change speed clutch 270, tubular shaft 232, spur gears 254 and 260, and output shaft 238.

*Forward—high range—high speed*
   Clutches engaged—264 and 268:
      Power is transmitted through the following gears, shafts and clutches: input shaft 216, forward high range clutch 264, tubular shaft 220, spur gears 224, 248 and 250, tubular shaft 240, high speed change speed clutch 268, and output shaft 238.

*Forward—top range—low speed*
   Clutches engaged—265 and 272:
      Power is transmitted through the following gears, shafts and clutches: input shaft 216, forward top range clutch 265, tubular shaft 255, gears 257, 259, countershaft 226, gears 248, 250, and 252, countershaft 228, low speed change speed clutch 272, tubular shaft 236, gears 256 and 258, and output shaft 238.

*Forward—top range—intermediate speed*
   Clutches engaged—265 and 270:
      Power is transmitted through the following gears, shafts and clutches: input shaft 216, forward top range clutch 265, tubular shaft 255, gears 257, 259, countershaft 226, intermediate change speed clutch 270, tubular shaft 232, spur gears 254 and 260, and output shaft 238.

*Forward—top range—high speed*
   Clutches engaged—265 and 268:
      Power is transmitted through the following gears, shafts and clutches: input shaft 216, forward top range clutch 265, tubular shaft 255, gears 257, 259, countershaft 226, gears 248 and 250, tubular shaft 240, high speed change speed clutch 268, and output shaft 238.

*Reverse—low speed*
   Clutches engaged—266 and 272:
      Power is transmitted through the following gears and shafts: input shaft 216, spur gears 222, 244 and 246, tubular shaft 234, reverse clutch 266, countershaft 228, low speed change speed clutch 272, tubular shaft 236, spur gears 256 and 258, and output shaft 238.

*Reverse—intermediate speed*
   Clutches engaged—266 and 270:
      Power is transmitted through the following gears, shafts and clutches: input shaft 216, spur gears 232, 244 and 246, tubular shaft 234, reverse directional clutch 266, countershaft 228, spur gears 252, 250 and 248, countershaft 226, intermediate change speed clutch 270, tubular shaft 232, spur gears 254 and 260, and output shaft 238.

*Reverse—high speed*

Clutches engaged—266 and 268:
Power is transmitted through the following gears, shafts and clutches: input shaft 216, spur gears 222, 244 and 246, tubular shaft 234, reverse directional clutch 266, countershaft 228, spur gears 252 and 250, tubular shaft 240, high speed change speed clutch 268, and output shaft 238.

Although not specifically recited, it should be understood that the various gears are of a predetermined size and number of gear teeth to achieve the various forward speeds in both low range and high range as well as the reverse speed.

With the above described arrangement it is now possible to obtain nine forward speeds and three reverse speeds by employing an input shaft 216, a pair of countershafts 226 and 228, an output shaft 238, gearing interconnecting the enumerated shafts, and various directional and change speed clutches. It should be noted also with the above described transmission that only two clutches are engaged in any of the forward or reverse speeds.

According to the provisions of the patent statutes, I have explained the principle, preferred construction, and mode operation of my invention and have illustrated and described what I now consider to represent its best embodiments. However, I desire to have it understood that, within the scope of the appended claims, the invention may be practiced otherwise than as specifically illustrated and described.

I claim:

1. In a transmission mechanism the combination comprising a first shaft and a second shaft arranged in spaced parallel relation to each other, said first and second shafts permanently geared together for rotation in the same direction, a first clutch positioned on said first shaft, first drive means for said first clutch operable upon engagement of said first clutch to transmit drive to said shafts in a given direction at a first predetermined speed, a second clutch positioned on said second shaft, second drive means for said second clutch operable upon engagement of said second clutch to transmit drive to said shafts in a direction opposite to said given direction, gear means arranged coaxially with and rotatable relative to said first shaft, output means drivingly connected to said gear means, third clutch means releasably securing said gear means to said first shaft, and operable upon engagement to transmit drive from said first shaft to said output means, and third drive means including a fourth clutch, said third drive means being operable upon engagement of said fourth clutch to transmit drive to said first and second shafts in said given direction at a second predetermined speed.

2. In a transmission mechanism the combination comprising a first shaft, a second shaft, and a third shaft, all of said shafts arranged in spaced parallel relation to each other, a first directional gear rotatably mounted on said first shaft, means to rotate said first directional gear in a given direction, a second directional gear rotatably mounted on said second shaft in meshing relation with said first directional gear so that said second directional gear is driven by said first directional gear in the opposite direction, gearing arranged to drivingly connect said first and second shafts to each other for rotation in the same direction, a first directional clutch for connecting said first directional gear to said first shaft to transmit motion from said first directional gear to said first and second shafts in a given direction at a predetermined speed, a second directional clutch for connecting said second directional gear to said second shaft to transmit motion from said second directional gear to said first and second shafts in an opposite direction, means including a third directional clutch, said means associated with said third shaft and operable upon engagement of said third clutch to provide drive for said gearing so that said first and second shafts are driven in said first given direction at another predetermined speed, and gear means arranged coaxially with and rotatable relative to said first shaft, output means drivingly connected to said gear means, fourth clutch means releasably securing said gear means to said first shaft and operable upon engagement to transmit drive from said first shaft to said output means.

3. In a transmission mechanism the combination comprising an input shaft, a first countershaft, a second countershaft, and a third countershaft, all of said countershafts arranged in spaced parallel relation to each other, a first directional gear rotatably mounted on said first countershaft, driving connections between said input shaft and said first directional gear so that said first directional gear is driven by said input shaft, a second directional gear rotatably mounted on said second countershaft in meshing relation with said first directional gear so that said second directional gear is driven by said first directional gear in the opposite direction, gearing including a gear rotatably positioned on said third shaft arranged to drivingly connect said first and second countershafts to each other for rotation in the same direction, a first directional clutch for connecting said first directional gear to said first countershaft to transmit motion from said input shaft to said first and second countershafts in a given direction at a predetermined speed, a second directional clutch for connecting said second directional gear to said second countershaft to transmit motion from said input shaft to both of said countershafts in an opposite direction, and means associated with said input shaft including a third directional clutch, said means being operable upon engagement of said third directional clutch to provide drive for said gearing so that said first and second countershafts are driven in said first given direction at another predetermined speed.

4. In a transmission mechanism the combination comprising a transmission housing, an input shaft journaled in said housing, a first tubular shaft, constantly meshing gearing including a gear nonrotatably secured to said input shaft, said gearing connecting said input shaft to said first tubular shaft, a second tubular shaft axially aligned with said first tubular shaft, shafting extending axially through said first and second tubular shafts, a third tubular shaft arranged axially on said input shaft, an output shaft journaled in said housing, driving connections between said second tubular shaft and said output shaft, other driving connections between said third tubular shaft and said shafting including a gear coaxially secured on said shafting, a first directional clutch for connecting said first tubular shaft to said shafting extending axially therethrough to transmit motion from said input shaft to said shafting, a second change speed clutch for connecting said second tubular shaft to said shafting extending axially therethrough to transmit motion from said shafting to said output shaft and a third directional clutch for connecting said input shaft to said third tubular shaft to transmit motion from said input shaft to said shafting.

5. In a transmission mechanism the combination comprising a transmission housing, an input shaft journaled in said housing, a first tubular shaft, constantly meshing gearing including a gear nonrotatably secured to said input shaft, said gearing connecting said input shaft to said first tubular shaft, a second tubular shaft axially aligned with said first tubular shaft, shafting extending axially through said first and second tubular shafts, a third tubular shaft arranged axially on said input shaft, an output shaft journaled in said housing, a fourth tubular shaft arranged axially on said output shaft, driving connections between said second tubular shaft and said output shaft, second driving connections between said third tubular shaft and said shafting including a gear coaxially secured on said shafting, third driving connections between said fourth tubular shaft and said last named gear, a first directional clutch for connecting said first tubular shaft to said shafting extending axially therethrough to transmit motion from said input shaft to said shafting, a second change speed clutch for connecting said second tubular shaft to said shafting extending axially therethrough to transmit motion from said shafting to said output shaft, a third directional clutch for connecting said input shaft to said third tubular shaft to transmit motion from said input shaft to said shafting, and a fourth change speed clutch for connecting said output shaft to said fourth tubular shaft to transmit motion from said shafting to said output shaft.

6. In a transmission mechanism the combination comprising a transmission housing, an input shaft journaled in said housing, a first tubular shaft, constantly meshing gearing connecting said input shaft to said first tubular shaft, a first countershaft extending axially through said first tubular shaft, a second tubular shaft arranged in spaced parallel relation with said first tubular shaft, constantly meshing gearing connecting said first tubular shaft and said second tubular shaft for rotation in opposite directions, a second countershaft extending axially through said second tubular shaft, an output shaft journaled in said housing, a third tubular shaft arranged axially on said input shaft, driving connections between said third tubular shaft and one of said countershafts including a gear nonrotatably secured to said countershaft, second driving connections between said first and second countershafts, a first clutch for connecting said first tubular shaft to said first countershaft to transmit motion from said input shaft to both of said countershafts in a given direction, a second clutch for connecting said second tubular shaft to said second countershaft to transmit motion from said input shaft to both of said countershafts in an opposite direction, a third clutch for connecting said input shaft to said third tubular shaft for transmitting motion to both of said countershafts in said first given direction, and third driving connections for connecting either of said countershafts to said output shaft.

7. In a transmission as set forth in claim 6, in which said third driving connection includes a fourth tubular shaft axially positioned on said output shaft, said fourth tubular shaft being interconnected in said second driving connection, and a fourth clutch for connecting said fourth tubular shaft to said output shaft to transmit motion from said second driving connection to said output shaft.

8. In a transmission as set forth in claim 7 in which said third driving connection includes a fifth tubular shaft axially positioned on said first countershaft, constant mesh gearing connecting said fifth tubular shaft to said output shaft, and a fifth clutch for connecting said fifth tubular shaft to said first countershaft to transmit motion from said first countershaft to said output shaft.

9. In a transmission as set forth in claim 8 in which said third driving connection includes a sixth tubular shaft axially positioned on said second countershaft, constant mesh gearing connecting said sixth tubular shaft to said output shaft, and a sixth clutch for connecting said sixth tubular shaft to said second countershaft to transmit motion from said second countershaft to said output shaft.

10. In a constant mesh six speed forward and three speed reverse transmission the combination comprising an input shaft, a first countershaft, a second countershaft and an output shaft, all of said shafts arranged in spaced parallel relation to each other, a spur gear secured to said input shaft and rotatable therewith, a first directional spur gear rotatably mounted on said first countershaft in meshing relation with said first named spur gear, a second directional gear rotatably mounted on said second countershaft and in meshing relation with said first directional spur gear, a third directional spur gear rotatably mounted on said input shaft, a first intermediate spur gear secured to said first countershaft in meshing relation with said third directional gear, a first change speed gear rotatably mounted on said output shaft and in meshing relation with said first intermediate gear, a second intermediate spur gear secured to said second countershaft and in meshing relation with said first change speed gear, a second change speed gear rotatably mounted on said first countershaft, a third change speed gear rotatably mounted on said second countershaft, gearing connecting said second and third change speed gears to said output shaft, a forward low range directional clutch arranged to frictionally engage said first directional gear to said first countershaft, a forward high range clutch arranged to frictionally engage said third directional gear to said input shaft, a reverse directional clutch arranged to engage said second directional gear to said second countershaft, a plurality of change speed clutches arranged to engage said respective change speed gears to said respective shafts, said forward low range clutch adapted upon engagement to rotate said intermediate gears and countershafts in a given direction at a predetermined speed, said forward high range clutch adapted upon engagement to rotate said intermediate gears and said countershafts in the same direction at a second predetermined speed, said reverse directional clutch adapted upon engagement to rotate said intermediate gears and countershafts in an opposite direction at a predetermined speed, and said change speed clutches arranged upon engagement to transmit the rotation of said countershafts to said output shaft.

11. In a transmission mechanism the combination comprising a first countershaft, a second countershaft, and a third countershaft, all of said countershafts arranged in spaced parallel relation to each other, a first directional gear rotatably mounted on said first countershaft, a second directional gear mounted on said second countershaft in meshing relation with said first directional gear, a third directional gear mounted on said third countershaft in meshing relation with said first directional gear, gearing connecting said first, second and third countershafts in a manner that said first and second countershafts rotate in the same direction and said third countershaft rotates in the opposite direction, a first directional clutch for connecting said first directional gear to said first countershaft to transmit rotation from said first directional gear to said countershafts in a given direction at a predetermined speed, a second directional clutch for connecting said second directional gear to said second countershaft to transmit motion to said countershafts in the opposite direction, and a third directional clutch for connecting said third directional gear to said third countershaft to transmit motion from said first directional gear to said countershafts in said first given direction at another predetermined speed.

12. In a transmission as set forth in claim 11 which includes a fourth countershaft arranged in spaced parallel relation to said other countershafts, change speed means for transmitting motion from said countershafts to said fourth countershaft at different predetermined speeds, and output means connected to said fourth countershaft.

13. In a transmission mechanism the combination comprising a first tubular shaft, a first countershaft extending axially through said first tubular shaft, a second tubular shaft arranged in spaced parallel relation with said first tubular shaft, constantly meshing gearing connecting said first tubular shaft and said second tubular shaft for rotation in opposite directions, a second countershaft extending axially through said second tubular shaft, a third tubular shaft arranged in spaced parallel relation with said first tubular shaft, a third countershaft extending axially through said third tubular shaft, constantly meshing gearing connecting said first tubular shaft and said third tubular shaft for rotation in opposite directions, other constantly meshing gearing connecting said first, second and third countershafts in a manner that said first and second countershafts rotate in the same direction and said third countershaft rotates in the opposite direction, a first directional clutch for connecting said first tubular shaft to said first countershaft for transmitting motion from said first tubular shaft to said three countershafts in a first direction at a predetermined speed, a second directional clutch for connecting said second tubular shaft to said second countershaft for transmitting motion from said second tubular shaft to said three countershafts in the opposite direction, a third directional clutch for connecting said third tubular shaft to said third countershaft for transmitting motion from said third tubular shaft to said three countershafts in said first given direction at another predetermined speed, input means to provide rotation for one of said tubular shafts, a fourth countershaft arranged in parallel relation with said other countershafts, and driving connections for connecting said first, second and third countershafts to said fourth countershaft.

14. In a transmission as set forth in claim 13 in which said driving connections include a fourth tubular shaft axially positioned on said first countershaft, constantly meshing gearing connecting said fourth tubular shaft with said fourth countershaft, and a first change speed clutch for connecting said fourth tubular shaft with said first countershaft to transmit motion from said first countershaft to said fourth countershaft.

15. In a transmission as set forth in claim 14 in which said driving connections include a fifth tubular shaft axially positioned on said second countershaft, constantly meshing gearing connecting said fifth tubular shaft with said fourth countershaft, and a second change speed clutch for connecting said fifth tubular shaft to said second countershaft for transmitting motion from said second countershaft to said fourth countershaft.

16. In a transmission as set forth in claim 15 in which said driving connections include a sixth tubular shaft coaxially positioned on said fourth countershaft, a spur gear coaxially positioned on and nonrotatably secured to said sixth tubular shaft, said spur gear forming a part of said constantly meshing gearing connecting said first, second and third countershafts for rotation together, and a third change speed clutch for connecting said sixth tubular shaft to said fourth countershaft for transmitting motion from said gearing connecting said first, second and third countershafts to said fourth shaft.

17. In a transmission as set forth in claim 16 in which said driving connections include a seventh tubular shaft coaxially positioned on said third countershaft, constantly meshing gearing connecting said seventh tubular shaft to said fourth countershaft, and a fourth change speed clutch for connecting said seventh tubular shaft to said third countershaft for transmitting motion from said third countershaft to said fourth countershaft.

18. In a transmission mechanism the combination comprising a first shaft, a second shaft, and a third shaft, said shafts arranged in parallel spaced relation to each other, said first and second shafts geared together for rotation in the same direction, other driving connections between said first and second shafts including meshing gears arranged coaxially on and rotatable relative to said first and second shafts and directional clutch means releasably securing said meshing gears to said respective first and second shafts, a first range clutch positioned on said third shaft for drivingly connecting said third shaft to said first and second shafts to drive through said other driving connections said first and second shafts in a given direction at a first predetermined speed upon engagement of said first range clutch, and a second range clutch positioned on said third shaft for drivingly connecting said third shaft to said first and second shafts to drive said first and second shafts in said given direction at a second predetermined speed upon engagement of said second range clutch.

19. In a transmission mechanism the combination comprising a first shaft, a second shaft, and a third shaft, all of said shafts arranged in spaced parallel relation to each other, a first directional gear rotatably mounted on said first shaft, means to rotate said first directional gear in a given direction, a second directional gear rotatably mounted on said second shaft in meshing relation with said first directional gear so that said second directional gear is driven by said first directional gear in the opposite direction, gearing arranged to drivingly connect said first and second shafts to each other for rotation in the same direction, a first directional clutch for connecting said first directional gear to said first shaft to transmit motion from said first directional gear to said first and second shafts in a first given direction at a predetermined speed, a second directional clutch for connecting said second directional gear to said second shaft to transmit motion from said second directional gear to said first and second shafts in a direction opposite to said first given direction, a third directional clutch associated with said third shaft and operable upon engagement to drive said first and second shafts in said first given direction at a second predetermined speed, and a fourth directional clutch associated with said third shaft and operable upon engagement to drive said first and second shafts in said first given direction at a third predetermined speed.

20. In a transmission mechanism the combination comprising a transmission housing, an input shaft journaled in said housing, a first tubular shaft, constantly meshing gearing connecting said input shaft to said first tubular shaft, a first countershaft extending axially through said first tubular shaft, a second tubular shaft arranged in spaced parallel relation with said first tubular shaft, constantly meshing gearing connecting said first tubular shaft and said second tubular shaft for rotation in opposite directions, a second countershaft extending axially through said second tubular shaft, an output shaft journaled in said housing, a third tubular shaft arranged axially on said input shaft, a fourth tubular shaft arranged axially on said input shaft, driving connections between said third tubular shaft and one of said countershafts, second driving connections between said fourth tubular shaft and one of said countershafts, third driving connections between said first and second countershafts, a first clutch for connecting said first tubular shaft to said first countershaft to transmit motion from said input shaft to both of said countershafts in a given direction, a second clutch for connecting said second tubular shaft to said second countershaft to transmit motion from said input shaft to both of said countershafts in a direction opposite to said given direction, a third clutch for connecting said input shaft to said third tubular shaft for transmitting motion to both of said countershafts in said first given direction, a fourth clutch for connecting said input shaft to said fourth tubular shaft for transmitting motion to both of said countershafts in said first given directions, and fourth driving connections for connecting either of said countershafts to said output shaft.

References Cited in the file of this patent

UNITED STATES PATENTS

| | | |
|---|---|---|
| 2,553,376 | LeTourneau | Mar. 18, 1947 |
| 2,712,245 | Lee | July 5, 1955 |
| 2,811,048 | Dence | Oct. 29, 1957 |
| 2,867,126 | Bolster | Jan. 6, 1959 |
| 2,972,901 | Gerst | Feb. 28, 1961 |